United States Patent [19] [11] 3,919,156
Khanna et al. [45] Nov. 11, 1975

[54] ANIONIC EMULSION POLYMERIZATIONS OF VINYL AND ACRYLIC MONOMERS

[75] Inventors: Ravi Khanna; Frederick J. Jacoby, both of Rochester, N.Y.

[73] Assignee: Eastman Kodak Company, Rochester, N.Y.

[22] Filed: May 21, 1974

[21] Appl. No.: 472,020

Related U.S. Application Data

[60] Division of Ser. No. 278,301, Aug. 7, 1972, abandoned, which is a continuation-in-part of Ser. No. 180,116, Sept. 13, 1971, abandoned.

[52] U.S. Cl. 260/29.6 TA; 260/29.6 RW; 260/80.8; 96/87 R; 96/68
[51] Int. Cl.² ............................................. C08F 2/26
[58] Field of Search ............ 260/29.6 TA, 29.6 RW

[56] References Cited
UNITED STATES PATENTS

| | | | |
|---|---|---|---|
| 3,271,345 | 9/1966 | Nadeau et al. | 260/29.6 TA |
| 3,328,330 | 6/1967 | Trofimow et al. | 260/29.6 TA |
| 3,401,134 | 9/1968 | Fantl et al. | 260/29.6 TA |
| 3,501,301 | 3/1970 | Nadeau et al. | 260/29.6 TA X |
| 3,753,940 | 8/1973 | Trofimow et al. | 260/29.6 RW |

Primary Examiner—Lucille M. Phynes
Attorney, Agent, or Firm—A. H. Rosenstein

[57] ABSTRACT

Processes for preparing copolymer lattices are disclosed whereby a water soluble acid monomer is dispersed in an aqueous medium in the presence of a dispersing agent, and after stabilization, the remaining monomers are added thereto and emulsion polymerization effected. Copolymer lattices are prepared thereby from a water soluble unsaturated aliphatic carboxylic acid, at least one nitrile of an unsaturated aliphatic carboxylic acid, and an unsaturated polymerizable compound free from acid groups. Such lattices provide improved coating compositions, such as for subbing layers on linear polyester supports.

8 Claims, No Drawings

ANIONIC EMULSION POLYMERIZATIONS OF VINYL AND ACRYLIC MONOMERS

This application is a divisional of the now abandoned U.S. Ser. No. 278,301, filed Aug. 7, 1972 which in turn is a continuation-in-part of the now abandoned U.S. Ser. No. 180,116, filed Sept. 13, 1971.

BACKGROUND OF THE INVENTION

1. Field of the Invention

This invention relates to improved processes for preparing copolymers and to aqueous dispersions prepared from said copolymers. In another aspect this invention relates to improved methods for producing polymeric dispersions useful as subbing layers on film supports. In yet another aspect, the present invention relates to improved processes for preparing copolymers which have recurring units derived from a water soluble carboxylic acid component, which process utilizes a high precentage of the acid groups available for said polymerization.

2. Description of the Prior Art

Aqueous emulsions of copolymers derived from monomers of the acrylic acid series and other polymerizable unsaturated compounds are frequently used as coating or adhesive agents. Vinylidene chloride copolymer coatings have been found particularly useful in the past in supplying waterproof qualities to materials on which they are coated, and in supplying strong adhesive bonds between the base material and subsequently applied coatings thereover. For example, copolymers of vinylidene chloride, acrylic esters, and itaconic acid as coatings for films and paper have been described in Alles et al. U.S. Pat. No. 2,627,088 issued Feb. 3, 1953, and U.S. Pat. No. 2,491,023 issued Dec. 13, 1949. These patents teach that a wide range of useful copolymers, and substratum coatings can be made by varying the amounts of vinylidene chloride, acrylic ester, and itaconic acid utilized in preparing the copolymers. It is well known in the art that some variations, while improving one property of the copolymeric composition, tend to cause deterioration of other desirable properties.

It is generally well known in the art of emulsion polymerization to colloidally emulsify a polymerizable ethylenically unsaturated compound in an aqueous medium, which usually contains both a wetting agent and a polymerization catalyst, as shown in U.S. Pat. No. 3,297,612, issued Jan. 10, 1967, to Lee et al. The use of multi-stage processes for emulsion polymerization is not new, and in U.S. Pat. No. 2,753,318, issued July 3, 1956, to Maeder, there is described a variety of methods for producing aqueous dispersions containing at least three monomers. It is noted that this latter patent discloses that certain copolymerizable water soluble acids, can, prior to the formation of the emulsion, be dissolved in water which contains an emulsifying agent and, if necessary, other additives.

The stability of the polymer latex, thus prepared, depends on the kind and amount of wetting agent, the particle size and the solids content of the latex formed, and still other factors. Furthermore, the nature of the residues which remain unincorporated into the latex is believed to impart different physical characteristics to the latex and may even be significant in determining the degree of adhesiveness, cracking, freedom from mottling, and the like. For example, while small amounts of residues, such as acrylic acids, which are left unreacted can be tolerated, the addition of large amounts of acrylic acid initially could give rise to low adhesion, cracking, and mottling.

It is known in the art that various water soluble acid monomers do not readily enter into emulsion polymerization reactions in proportion to the amount of monomer initially employed, so that the compositions of the resulting polymers have been erratic and essentially unpredictable. While this has been partially overcome in the past by employing large concentrations of surfactants, the relatively high surfactant levels which are required to insure good reproducibility of polymer compositions has led to appearance defects, such as iridescent mottle and lines, on the coating compositions prepared according to such processes. These defects are undesirable and commercially unacceptable in most photographic materials and, in particular, in x-ray film supports, where clouding and unwanted lines tend to obscure the image obtained. It has been found that reducing the level of surfactant or emulsifying agent, while reducing the undesirable physical properties, nonetheless leads to very poor batch reproducibility, so that a significant percentage of coating compositions prepared thereby exhibit unwanted and unacceptable physical properties. When the coating composition is utilized as a subbing layer for a photographic support, this is primarily exhibited by poor photographic emulsion adhesion, which appears to result from a low or poor incorporation of the water soluble carboxylic acid monomer into the polymer forming the subbing layer.

The known processes described for preparation of polymeric dispersions and methods for preparing subbing and other layers have not provided compositions having a significantly high incorporation of water soluble acid groups derived from the low percentage of acid monomers desirably employed in the polymer mix, as is believed essential in order to provide the properties sought.

The process for preparing a polymer latex with polymerizable monomers which contain an ethylenically unsaturated carboxylic acid and at least one vinylidene chloride monomer which in interpolymerizable therewith, is not new. However, the manner in which the monomers are first dispersed or emulsified in water, if at all, and thereafter polymerized, has been the subject of considerable search. In U.S. Pat. No. 3,296,175 issued Jan. 3, 1967, to Fantl et al, there is described a process which consists essentially of delaying the addition of the acid monomer to the emulsion until at least about 70 percent by weight of the monomer has been polymerized. This process is to be distinguished from the present invention in which the monomers containing carboxylic acid are first dispersed in water and stabilized as described hereinafter.

U.S. Pat. No. 3,271,345 issued Sept. 6, 1966 to Nadeau et al, discloses the incorporation of certain dihydroxy aromatic compounds in polymeric subbing layers, and also replaces the carboxylic acid content with corresponding lower alkyl esters. Even though this patent apparent teaches the useful and preferred ranges of monomers which make up the subbing copolymers of the present invention and includes the specific monomers useful in the present process, those ranges relate only to starting mixtures. This patent, unlike the present invention, does not teach one to modify the resulting latex by insuring that a significant amount of available carboxylic acid groups will be incorporated into the finally prepared polymer latex.

For these reasons, it is believed that the process of the present invention is an improvement in the art, in that it provides a method for substantially increasing the number of available carboxylic acid groups incorporated into the polymer, thus decreasing available acid groups remaining in the polymerization medium as homopolymers of the acid, or otherwise.

SUMMARY OF THE INVENTION

The present invention provides an improved process for the preparation of copolymer lattices by emulsion polymerization employing at least one water soluble carboxylic acid group containing monomer. The steps of this process insure that a significant proportion of units derived from the carboxylic acid monomer is incorporated into the final copolymer composition. This is accomplished according to the practice of the present invention, whereby the water soluble carboxylic acid group containing monomer is first mixed in aqueous solution with a small amount of emulsifying agent and the members of the thus formed combination are contacted for a period of time sufficient to provide a significantly and substantially stabilized dispersion of the water soluble carboxylic acid group containing monomer in the aqueous medium.

By stabilized is meant that a high degree of homogeneity is attained between the dispersed units of water soluble carboxylic acid group containing monomer and the surface active or dispersing agent. This stabilization is achieved when the small amount of anionic dispersing agent is mixed with the water soluble monomer and agitated for a period of time of not less than about 30 minutes, in the absence of the remaining copolymerizable materials or initiator. The thus formed micro-dispersion of monomer and surfactant remains unexpectedly stable for a time sufficient to permit good emulsion polymerization between the carboxylic acid monomer and the other monomeric components. Thereafter, the various other monomers required to form a resulting copolymer are added and polymerization effected. Applicants have found that a minimum contact or stabilization period of at least 30 minutes is required, and a preferred time period may range from about 45 minutes to about 3 hours. Longer stabilization periods do not adversely effect the results to be obtained, but do not materially improve such results.

Accordingly, it is an object of this invention to provide improved processes for the preparation of copolymer lattices by emulsions polymerization, which processes insure the incorporation into the polymer of a high percentage of desirable, available acid group containing moieties derived from the carboxylic acid group containing monomer.

It is another object of the present invention to provide highly adhesive, crack-resistant coatings prepared from compositions prepared according to the described processes.

It is also an object of the present invention to provide a photographic element comprising a polymeric linear polyester film base having coated thereon at least one adhesive subbing layer composed of a copolymer latex prepared according to the present improved process.

It is yet another object of the present invention to provide a process for the production of acid stable aqueous dispersions of solvent soluble polymers prepared in the presence of a small amount of emulsifying or dispersing agent such that good reproducibility of polymer is achieved.

Still other objects will be apparent to those skilled in the art from the specification and claims which follow.

DESCRIPTION OF PREFERRED EMBODIMENTS

The processes of the present application relate to the preparation of a copolymer latex by emulsion polymerization employing at least one water soluble carboxylic acid group containing monomer. The improvement comprises first contacting, in an aqueous medium, said water soluble carboxylic acid group containing monomer and a small amount of emulsifying agent, thereafter mixing said components for a period of time greater than about 30 minutes, to provide a substantially stable dispersion of said water soluble carboxylic acid group containing monomer. After this, the various remaining monomers forming said copolymer are added, and emulsion polymerization effected. In a preferred embodiment of the present invention there is prepared a polymer latex according to the process which comprises emulsifying by the steps described, a simple water soluble unsaturated carboxylic acid monomer, at least one nitrile of an unsaturated carboxylic acid and an unsaturated polymerizable compound free from acid groups.

In yet another preferred embodiment of the present invention there is provided a highly adhesive, crack resistant coating prepared from a coating composition made by the above described process. In yet another embodiment there is provided a photographic element comprising a polymeric linear polyester film base having coated thereon at least one adhesive subbing layer composed of a copolymer latex prepared according to the process described.

In one preferred embodiment there is provided an acid stable aqueous dispersion of a solvent-soluble copolymer consisting essentially of from about 5 percent to about 40 percent by weight of solids of a copolymer containing recurring uints derived from about 70 percent to about 85 percent by weight of an unsaturated polymerizable monomer free from acid groups, from about 12 percent to about 20 percent by weight of a nitrile of an unsaturated carboxylic acid, and from about 4 percent to about 10 percent by weight of a water soluble unsaturated carboxylic acid, by a process which comprises incorporating an amount of acid groups into the copolymer of at least about 50 percent by weight, and preferably at least about 70 percent by weight, of the total concentration of acid groups initially added as water soluble carboxylic acid, i.e., the acid group containing monomer.

In yet another preferred embodiment, the above described process is used to produce an acid stable aqueous dispersion of a solvent soluble copolymer comprising retained acid groups of at least about 50 percent and preferably at least 70 percent by weight of the total concentration of acid groups initially added in the form of carboxylic acid, consisting essentially of about 5 percent to about 40 percent by weight of solids, said polymer having from about 70 percent to about 85 percent by weight of recurring units derived from vinylidene chloride monomer, about 12 percent to about 20 percent by weight of recurring units derived from acrylonitrile monomer and about 4 percent to about 10 percent by weight of recurring units derived from an acrylic acid monomer. This process first comprises combining the acrylic acid monomer in aqueous solution with an anionic emulsifying agent in a small amount, contacting these components for at least one-half hour, and preferably for from about 45 minutes to about 2.5 hours, after which vinylidene chloride monomer, acrylonitrile monomer, and initiator are added and emulsion polymerization effected.

According to the process described herein, typical water soluble carboxylic acid group containing monomers include those mono-carboxylic or poly-carboxylic acids such as maleic acid, fumaric acid, itaconic acid, crotonic acid and the like, and the anhydrides and lower alkyl half esters of those acids which are dibasic. And of particular advantage is the use of simple aliphatic unsaturated mono-carboxylic acids. Particularly preferred are ethylenically unsaturated monocarboxylic acid monomers, such as those having a methylene group bound to the alpha carbon atom of the general formula:

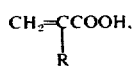

in which R represents hydrogen, halogen or a lower alkyl radical, such as those having from 1 to 6 carbon atoms, for example, methacrylic acid, α-chloroacrylic acid, and particularly acrylic acid. By aliphatic is meant having from about 2 to 6 carbon atoms in a linear chain.

The nitriles of the unsaturated carboxylic acids described herein include those nitriles of simple unsaturated aliphatic mono-carboxylic acids such as those having a methylene group bound to the alpha carbon atom and corresponding to the general formula

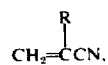

in which R represents hydrogen or a lower alkyl radical, such as those having from 1 to 6 carbon atoms. These include, for example, methacrylic acid nitrile and acrylic acid nitrile and the like. It is known in the art that acrylic acid nitrile, for example, can be economically obtained from the reaction between hydrocyanic acid and acetylene in the presence of a cuprous salt catalyst.

By the term aliphatic, in describing the unsaturated carboxylic acid nitriles, it will be understood to mean having from 2 to 6 carbons in a linear chain, such as butenoic and hexenoic acid nitrile and the like.

Also suitable are compounds of the acrylic acid series which are different from the nitriles or acids, such as, for example, alkyl acrylate and alkyl methacrylates and various analogous derivatives of alpha chloroacrylic acid. Among the compounds which are not copolymerizable or interpolymerizable by themselves these are included di-esters of maleic acid, and fumaric acid, and esters of crotonic acid; unsaturated hydrocarbons such as camphene; and also unsaturated ethers such as isobornylallyl ether, or diallyl ether, and the like.

The unsaturated polymerizable compounds which are free from acid groups and can be used in the preparation of the copolymers described herein include a wide variety of monomers which are both themselves polymerizable inter se, and also those which cannot be polymerized alone. For example, among the first group are polymerizable compounds having one or more unsaturated linkages such as those containing the vinyl moiety, including vinyl esters of organic acids, such as vinyl acetate, vinyl butyrate, and the like; and also vinyl alkyl ketones, vinyl halides such as vinyl chloride, vinylidene chloride and the like; and vinylaryl compounds such as styrene and substituted styrenes.

As dispersing agents or surface active agents used in preparing the emulsions, and in particular in dispersing the starting materials comprising the carboxylic acid group containing monomers, there are employed those surfactants or dispersing agents which are anionic. These include a wide variety of addenda useful in decresing the tension at the boundary surface between components of the reaction mixture. Of particular utility are the water soluble salts, such as the sodium salts, of the sulfated higher alcohols, such alcohols having more than 8 carbon atoms. For example, alkyl and alkyl aryl sulfonates may be employed, including polyglycol ethers of fatty alcohols of high molecular weight, and in particular the sodium salt of alkyl aryl polyether sulfonate, commercially available from Rohm and Haas Company by their trademarked name of Triton X-200. The total concentration of dispersing agent required has been found to be quite small, such as about 0.5 to about 2 percent, and preferably from about 0.7 to about 1.5 percent, of at least one anionic dispersing agent (based on total weight of water soluble carboxylic acid group containing monomer).

As polymerization catalyst, the action of which induces polymerization when the component monomers are all present, there are included the usual compounds capable of catalyzing polymerizations. These include organic or inorganic peroxides or persalts, for example, peracetic acid acetyl peroxide, benxoyl peroxide, benzoyl acetyl peroxide, lauryl peroxide, hydrogen peroxide, percarbonates, persulfates, perborates, and the like. The use of any particular catalyst and its quantity is regulated in known manner, depending on the desired course of the reaction and the properties desired in the copolymers. A plurality of polymerizing catalysts can be used, just as a plurality of emulsifying agents can be used, provided that their use enhances the process and the resulting composition. The action of the polymerization catalysts may be increased or enhanced by the simultaneous action of heat and/or actinic radiation. It may also be possible to carry out polymerization only by the action of heat or actinic rays without the addition of catalyzing compounds. While there are described herein various components used in the monomeric state, one or more of these compounds may be in a partially pre-polymerized condition.

The polymerization can be conducted at ordinary temperatures, and in particular the stabilization of the dispersing agent and the carboxylic acid group containing monomer is achieved at a wide range of temperatures, but preferably at about ambient temperature. It has been found advantageous to conduct the actual polymerization, however, at elevated temperatures, such as, for example, temperatures ranging from about 30°C to about 75°C and preferably in a range from about 58°C to 65°C. It has been found advantageous to effect the polymerization in the absence of air or oxygen, such as in the presence of an inert gas, e.g., nitrogen, carbon dioxide, or the like. According to the practice of the present invention, emulsion polymerization is effected advantageously with a high percentage of yield within the temperature range described above, for a period of up to about 16 to 24 hours and preferably from about 18 to 20 hours. While the stabilization step between the dispersing agent and the water soluble acid component is achieved over a period of time of at least one-half hour or more, it has been found helpful to provide concurrent agitation such as that supplied by rotary beaters, blenders and the like, but this may be achieved in a variety of ways.

It is likewise possible, in addition to the aforedescribed catalyst and regulators, to use so called activators which can include inorganic oxidizable sulfur compounds containing oxygen such as sulfur dioxide, sodium bisulfite, sodium sulfite, sodium metabisulfite, ammonium bisulfite, and the like. The simultaneous use of these activators and polymerization catalysts yielding oxygen forms so-called Redox Systems, which favorably influence the course of the polymerization. In addition to these activators, there may also be used water soluble aliphatic tertiary amines such as triethanolamine or diethanolamine and the like. As is well known in the art, it is also possible to accelerate the action of the polymerization catalysts by the addition of a complex compound of a heavy metal which is capable of existing in more than one condition of valency, and is present in the reduced condition.

The quantities of the individual starting compounds which are used for making the preferred copolymers described herein can vary within wide limits and depend to a great extent on the adhesiveness and other properties which are found desirable in the finished product. The proportion of the nitrile employed amounts to from about 12 to about 20 weight percent, i.e., 1 to 3 parts of total monomer. The amount of water soluble carboxylic acid employed ranges from about 4 to about 10 weight percent, i.e., 0.3 to 1.5 parts. The amount of unsaturated polymerizable compound, free from acid groups, employed in the starting composition is about 70 to about 85 weight percent, i.e., 6 to 12 parts of total monomer.

By the present invention the excessive use of carboxylic acid group containing monomer is obviated in view of the fact that a significant percentage of said carboxylic acid monomer is utilized and is present in the resulting polymer. For example, in a preferred process from about 6 to about 8 percent, by total weight of the raw mix, of the carboxylic acid group containing monomer is utilized, and a percentage of recurring units of carboxylic acid containing monomer in the product appears as at least 70 percent of the starting weight. Thus, contrary to the teachings of U.S. Pat. No. 2,753,318, issued to Maeder on July 3, 1956, the proportion of the unsaturated carboxylic acid to be copolymerized is generally kept low. Surprisingly, the total weight of monomer finally incorporated into the polymer remains quite high. In addition, and contrary to said patent, dispersions of copolymers of this invention are generally thick enough in their liquid form that no additional addenda are required to enhance their spreadability.

The dispersions produced by the present process are quite stable and can, therefore, be applied in a variety of ways. While there is no need to add further modifying substances such as plasticizers and the like, it has been found extremely helpful in enhancing good bonding to film supports such as a polymeric linear polyester film base, and in particular poly(ethylene terephthalate) film supports, to add dihydric phenols and/or a glycoside in small amounts to said dispersion. Particularly preferred among these addenda are resorcinol and/or saponin. The former is used in a preferred range of 0.2 to 2.0 weight percent, based on the total weight of the dispersion, and the latter is preferably used in a 0.05 to 1.0 weight percent range, likewise based on the total weight of the dispersion. When dispersions containing such addenda are overcoated on film base as described, the adhesive properties are maximized. Naturally occurring colloidal overcoatings, such as gelatin, albumin, and casein, and various synthetic hydrophilic colloids, such as acrylic acid polymers, methacrylic acid containing polymers, and the like, are easily adhered to such subbing layers.

Good results are obtained when overcoats containing various addenda, including dyes, pigments, dispersed particles such as silver halides and the like, and various other addenda commonly found in light sensitive photographic elements, are coated over the subbing layers. Typical of the various layers which can be coated over the subbing layers described herein are silver halide emulsions, as disclosed in *Product Licensing Index*, Vol. 92, Dec. 1971, publication No. 9232, pages 107–110, Paragraph I. Various addenda may be employed with such photographic elements in accordance with said *Product Licensing Index* publication, Paragraphs III, IV, V, VI, VII, VIII, IX, XI, XII, XIII, XIV, XV, XVI, XVII, and XVIII.

The photographic layers and other layers of a photographic element employed and described herein can be coated on a wide varietey of supports. Typical supports include cellulose nitrate film, cellulose ester film, poly(vinyl acetal) film, polystyrene film, poly(ethylene terephthalate) film, polycarbonate film and related films or resinous materials, as well as glass, paper, metal and the like. Preferred supports include linear polyester films.

This invention is further illustrated by the following examples.

EXAMPLE 1

A. Into a jacketed ten-gallon stainless steel reactor are placed 22,336 g of distilled water, 425 g of Triton X-200* (23 percent solids) and 795 g acrylic acid. The mixture is moderately stirred for 2 hours with cooling at 20°C and the acid and dispersant stabilized. The air above the reactor is then evacuated to less than 12 psig and brought up with nitrogen three times. After one more evacuation, 12.5 g of potassium persulfate, dissolved in 908 g distilled water, 7722 g of vinylidene chloride, and 1502.5 g of acrylonitrile are added to the reactor. With rapid stirring the temperature is raised to 60°C. This raises the pressure to 19 psig. The reaction mixture is held at 60°C for 16 hours. The pressure gradually drops till there is a slight vacuum in the reactor. A sample of the resulting polymer is separated from the latex, collected, and analyzed. The polymer has an inherent viscosity in cyclohexanone (0.25 g per deciliter of solution at 25°C) of 1.66, and about 75 percent of the acrylic acid initially used in the mix is present in the finally-resulting polymer. The ratio of starting materials, by weight, is 8 percent acrylic acid, 77 percent vinylidene chloride, and 15 percent acrylonitrile.

*Triton X-200 is the sodium salt of an alkyl aryl polyether sulfonate sold by Rohm and Hass Company.

B. Similar good results are obtained when methyl acrylate (13 percent by weight), vinylidene chloride (77 percent by weight), and itaconic acid (10 percent by weight), are substituted in the above procedure.

EXAMPLE 2

The polymer latex of Example A above is diluted with water to 7 percent solids. Next, 1 weight percent (based on the total dispersion) of resorcinol and 0.1 weight percent (based on the total dispersion) of saponin are added, and the mixture is coated on unoriented poly(ethylene terephthalate). This support is drafted and tentered and an aqueous gelatin subcoating applied to the dired polymer undercoat. Separate samples of the resulting subbed film base are then coated with a silver halide x-ray emulsion and with a lithographic high speed silver halide emulsion. These samples are labeled G1 and G2 respectively in the following Table 1.

For comparison, other film samples are prepared as above, one set having a high speed lithographic silver halide emulsion coated thereon, and another set having a silver halide x-ray emulsion. There is substituted one of the following materials for the undercoat latex, or the undercoating composition is altered as indicated, in order to show the unexpectedly good results obtained by the practice of the present process.

A. Copoly(methyl acrylate-vinylidene chloride itaconic acid) [the weight ratio of starting monomers employed is 7.35:41.6:1, respectively]. The latex is prepared with the normally used amount [2.5 weight percent based on the weight of monomers] of the surfactant Triton X-770 (the trademark of Rohm and Hass Company for its sodium salt of an alkylaryl poly(ether sulfate)) using the conventional emulsion polymerization process as described in U.S. Pat. No. 2,753,318 to Maeder, issued July 3, 1956. No contact time is allowed for stabilization of the acid-dispersant mixture beyond a brief mixing to assure emulsification.

B. The latex of A above is coated with 1 weight percent (based on the total weight of the dispersion) of the resorcinol added.

C. A polymer latex as described for A above but prepared with a reduced level (0.5 weight percent based on the total weight of monomers employed) of Triton X-770 (T.M.) surfactant and coated with 1 weight percent (based on the total weight of the dispersion) of resorcinol and 0.25 weight percent (based on the total weight of the dispersion) of saponin added.

D. Copoly(acrylonitrile-vinylidene chloride-acrylic acid) [weight ratio of monomers employed = 1.4:8.0:0.6] latex prepared by the conventional emulsion polymerization procedure as described in U.S. 2,753,318, with the usually used amount, i.e. (2.5 weight percent based on the total weight of monomers employed) of Triton X-770 (T.M.) and coated with 1 weight percent (based on total weight of the dispersion) of resorcinol and 0.1 weight percent (based on the total weight of the dispersion) of saponin added.

E. A polymer latex as described for D above but prepared with a reduced level (0.5 weight percent based on the total weight of monomers) of Triton X-770 (T.M.) surfactant. This latex is unstable.

F. A polymer latex as described for D above but prepared with a reduced amount (1.0 weight percent based on the total weight of monomers employed) of Triton X-770 (T.M.) and with 1 weight percent (based on the total weight of monomers) of saponin as a coating aid, and coated with 1 weight percent (based on the total weight of solution) and 1.0 weight percent (based on the total weight of solution) of resorcinol and 0.1 weight percent (based on the total weight of solution) of saponin added. (Note that good formulations of this type are not able to be consistently reproduced.)

The appearance, adhesion, and emulsion-cracking qualities of the photographic film samples are evaluated qualitatively and the results are recorded in the following Table 1. Support appearance is evaluated by visual inspection for iridescent lines or mottle. Adhesion is evaluated by the cellophane tape peel test as described in Nadeau et al, U.S. Pat. No. 3,271,345, issued Sept. 6, 1966. Emulsion-cracking is evaluated by scribing lines onto a strip of film sample to be tested and alternately wetting and drying the samples at 160°F on a revolving wheel and inspecting the samples under a microscope for peeling away of the emulsion from the film base. The results obtained for each series type of emulsion, i.e. x-ray or lithographic, are the same so that no distinction is made for emulsion type in the following Table 1.

TABLE 1

| Latex | Support Appearance | Emulsion Adhesion | Emulsion Cracking |
|---|---|---|---|
| A | Good | Bad | Fair |
| B | Bad | Good | Fair |
| C | Good | Good | Fair |
| D | Bad | Good | Good |
| E | (Latex No Good) | (No Results) | (No Results) |
| F | Good | Good | Good |
| G1 | Good | Good | Good |
| G2 | Good | Good | Good |

From the above, it may be seen that latex D has an excessively high surfactant content and gives a bad support appearance. Similarly prepared latex F has a lower surfactant content and yields good support appearance. However, it is noted that the process used in preparing latex F is unreliable in that reproducible results are not always obtained. This is demonstrated by the following example.

EXAMPLE 3

Four polymer lattices were prepared as in Example 2, latex F. These lattices were coated upon unoriented poly (ethylene terephthalate) and overcoated with a gelatin subcoating and a lithographic high speed silver halide emulsion as set forth in Example 2. Acid incorporation values, based upon the amount of acrylic acid monomer employed, are determined, and adhesion is qualitatively evaluated. The results are shown in Table 2.

Table 2

| Latex | % Acid Incorporation | Adhesion |
|---|---|---|
| $F_1$ | 66 | Bad |
| $F_2$ | 53 | Bad |
| $F_3$ | 53 | Bad |
| $F_4$ | 86 | Good |

From this data, it may be seen that when a high acid incorporation value is obtained, good adhesion results. It may also be seen, however, that wide variations of said acid incorporation value may result in identically prepared samples, resulting in unreliable adhesiveness.

To further illustrate the criticality of the acid incorporation value, and the relationship of this value to the stabilization of the acid monomer-dispersant mixture, the following examples are presented.

EXAMPLE 4

A number of polymer lattices are prepared in accordance with the process of this invention as set forth in Example 1(A), with the indicated variations. Film samples are prepared from these lattices in accordance with Example 2. Acid incorporation values are determined, and emulsion adhesion tests conducted using a lithographic high speed silver halide emulsion as in Example 2. The results are set forth in Table 3 below. Latex numbers 3, 4, 5, 6, 19, and 20 particularly illustrate the relationship of acid incorporation to stabilization time.

TABLE 3

| Latex | Surfactant Name | % Concentration | Reaction Temp °C | % Acid Incorp | Time for Stabilization | Adhesion |
|---|---|---|---|---|---|---|
| 1 | (a) | 1.0 | 60 | 75 | 2 hours | * |
| 2 | (a) | 1.0 | 60 | 72 | 2 hours | * |
|   | (a) | 1.0 | 60 | 72 | 2 hours | good |
| 3 |   |   |   |   |   |   |
| 4 | (a) | 1.0 | 60 | 73.5 | 2 hours | good |
| 5 | (a) | 0.4 | 30 | 52 | 0 | * |
| 6 | (a) | 0.4 | 30 | 86 | 1 hour | * |
| 7 | (a) | 0.4 | 30 | 92 | 1 hour | * |
| 8 | (a) | 0.4 | 30 | 87 | 3 hours | * |
| 9 | (a) | 0.3 | 30 | 79 | overnight | * |
| 10 | (a) | 0.3 | 30 | 78 | overnight | * |
| 11 | (a) | 0.5 | 30 | 86 | overnight | * |
| 12 | (a) | 1.0 | 60 | 79 | 2 hours | * |
| 13 | (a) | 1.0 | 60 | 77 | 2 hours | * |
| 14 | (b) | 1.0 | 60 | 74 | 2 hours | * |
| 15 | (b) | 1.0 | 60 | 75 | 2 hours | * |
| 16 | (b) | 1.0 | 60 | 76 | 1.5 hours | good |
| 17 | (b) | 1.0 | 60 | 75 | 1.5 hours | good |
| 18 | (b) | 1.0 | 60 | 77 | 1.5 hours | good |
| 19 | (a) | 1.0 | 60 | 67 | 15 minutes | * |
| 20 | (a) | 1.0 | 60 | 81 | 30 minutes | * |

*Latex only prepared; film samples not prepared.
(a) Triton X200 (TM)
(b) Alipal CO436 (TM), believed to be the ammonium salt analogous to Triton 770.

The invention has been described in detail with particular reference to certain preferred embodiments thereof, but it will be understood that variations and modifications can be effected within the spirit and scope of the invention.

There is claimed:

1. In an emulsion polymerization process for preparing a latex of at least ternary copolymers, which process comprises emulsifying the monomer of a water soluble unsaturated carboxylic acid, at least one nitrile or ester of an unsaturated carboxylic acid, and an unsaturated polymerizable compound free from acid or nitrile groups, the improvement comprising the steps of first contacting said water soluble acid in an aqueous medium with an anionic dispersing agent, agitating said mixture for at least 30 minutes to provide stabilization between said carboxylic acid group containing monomer and the dispersing agent, after which the remaining monomers forming said copolymers are added and emulsion polymerization effected.

2. The process of claim 1 comprising adding said water soluble acid to an aqueous solution containing, as an anionic dispersing agent, an alkyl aryl polyether sulfonate.

3. The process of claim 1 comprising contacting said aqueous solution of monomer and dispersing agent, at about ambient temperature, for a period of greater than about 45 minutes.

4. The process of claim 1 comprising effecting emulsion polymerization at a temperature in the range of from about 30°C to about 75°C.

5. The process of claim 1 comprising contacting said water soluble acid and said anionic dispersing agent in a nitrogen atmosphere.

6. The process of claim 1 comprising copolymerizing from about 6 to 12 parts of an unsaturated polymerizable compound free from acid groups, from about 1 to about 3 parts of a nitrile of a water soluble unsaturated monocarboxylic acid, and from about 0.5 to about 1.5 parts of an aliphatic water soluble unsaturated monocarboxylic acid.

7. The process of claim 6 comprising providing a resulting copolymer comprising from about 70 percent to about 90 percent of the acid groups available from said water soluble monocarboxylic acid monomer.

8. The process of claim 1 comprising employing from about 0.7 to about 1.5 percent of at least one anionic dispersing agent based on total weight of water soluble carboxylic acid group containing monomer.

* * * * *